United States Patent
Kato et al.

(10) Patent No.: US 9,274,252 B2
(45) Date of Patent: Mar. 1, 2016

(54) POLYCARBONATE RESIN COMPOSITION

(75) Inventors: Noriyuki Kato, Tokyo (JP); Hiroki Furuhashi, Tokyo (JP); Shu Yoshida, Tokyo (JP); Kazuaki Kaneko, Tokyo (JP); Keiichi Kameyama, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 487 days.

(21) Appl. No.: 13/390,190

(22) PCT Filed: Aug. 11, 2010

(86) PCT No.: PCT/JP2010/063605
§ 371 (c)(1),
(2), (4) Date: Apr. 27, 2012

(87) PCT Pub. No.: WO2011/019047
PCT Pub. Date: Feb. 17, 2011

(65) Prior Publication Data
US 2012/0220737 A1    Aug. 30, 2012

(30) Foreign Application Priority Data

Aug. 12, 2009   (JP) ................... 2009-187354

(51) Int. Cl.
*C08L 69/00* (2006.01)
*G02B 1/04* (2006.01)
*C08G 64/02* (2006.01)

(52) U.S. Cl.
CPC ............ *G02B 1/041* (2013.01); *C08G 64/0208* (2013.01); *C08L 69/00* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 4,910,283 A * | 3/1990 | Kawaki et al. | 528/201 |
| 6,355,768 B1 * | 3/2002 | Fujimori et al. | 528/196 |
| 6,359,103 B1 * | 3/2002 | Nagai et al. | 528/198 |
| 6,537,636 B1 * | 3/2003 | Wisnudel et al. | 428/64.1 |
| 6,777,528 B2 * | 8/2004 | Fujimori et al. | 528/371 |
| 8,026,336 B2 | 9/2011 | Kato et al. | |
| 2004/0116618 A1 | 6/2004 | Nagai et al. | |
| 2004/0245511 A1 | 12/2004 | Fujimori et al. | |
| 2012/0095139 A1 | 4/2012 | Yoshida et al. | |
| 2012/0116000 A1 | 5/2012 | Yoshida et al. | |

FOREIGN PATENT DOCUMENTS

| | | |
|---|---|---|
| CN | 1238346 A | 12/1999 |
| CN | 1572836 A | 2/2005 |
| EP | 1 384 755 A1 | 1/2004 |
| EP | 1 484 351 A1 | 12/2004 |
| EP | 2 053 072 A1 | 4/2009 |
| JP | 2569593 | 10/1996 |
| JP | 2003 55543 | 2/2003 |
| JP | 2003-327682 | 11/2003 |
| JP | 2003-335853 | 11/2003 |
| JP | 2004 315747 | 11/2004 |
| JP | 2004 359900 | 12/2004 |
| JP | 2005232256 | * 9/2005 |
| JP | 2005247913 | * 9/2005 |

OTHER PUBLICATIONS

Brunelle, "Advances in Polycarbonates" ACS Symposium Series 898; 2005; pp. 8-10.*
U.S. Appl. No. 13/383,734, filed Mar. 20, 2012, Kato.
International Preliminary Report on Patentability issued Feb. 23, 2012, in PCT/JP2010/063605, filed Aug. 11, 2010 (with English-language translation).
International Preliminary Report on Patentability issued Mar. 22, 2012, in PCT/JP2010/063605, filed Aug. 11, 2010.
Extended European Search Report issued Oct. 10, 2013, in European Patent Application No. 10808230.6.
International Search Report Issued Sep. 28, 2010 in PCT/JP10/63605 Filed Aug. 11, 2010.
Combined Chinese Office Action and Search Report issued Dec. 5, 2012 in Chinese Patent Application No. 201080035487.7 with English translation and English translation of category of cited documents.

* cited by examiner

*Primary Examiner* — David Buttner
(74) *Attorney, Agent, or Firm* — Oblon, McClelland, Maier & Neustadt, L.L.P.

(57) ABSTRACT

To provide a polycarbonate resin composition having a high Abbe's number, high strength and excellent stainability.
Disclosed is a polycarbonate resin composition prepared by blending
 a polycarbonate resin (A) prepared by forming carbonate bonds in tricyclo[5.2.1.0$^{2,6}$]decanedimethanol with a diester or phosgene, and a weight-averaged molecular weight (Mw) of the polycarbonate resin (A) being equal to or more than 25,000, and
 a polycarbonate resin (B) prepared by reacting 2,2-bis(4-hydroxyphenyl)propane and phosgene, and weight-averaged molecular weight (Mw) of the polycarbonate resin (B) being equal to or more than 30,000, wherein
 a ratio thereof, 100×(A)/((A)+(B)), is from 1 to 99% by weight.

20 Claims, No Drawings

POLYCARBONATE RESIN COMPOSITION

TECHNICAL FIELD

The present invention relates to a polycarbonate resin composition having a high Abbe's number and high strength and excellent stainability.

BACKGROUND ART

Polycarbonate resins formed of 2,2-bis(4-hydroxyphenyl)propane (referred to as "BPA" or "bisphenol A" hereinunder) have been used in various optical material applications such as substrates of CD or DVD, optical films, optical sheets, a wide variety of lenses, or prisms since they are excellent in transparency, heat resistance, low water-absorption properties, chemical resistance, mechanical characteristics, and dimension stability.

However, the bisphenol resins formed of only BPA have a large photoelastic coefficient, and the molded articles formed of the resins may have large birefringence due to the relatively inferior melt-flowability thereof. And the resins have a high refractive index, 1.58, but they have a low Abbe's number, 30, which indicates that the refractive index and the Abbe's number are ill-balance. Therefore, they suffer from the disadvantage of not having capabilities sufficient for being used in a variety of the applications such as optical recording materials and optical lenses. Furthermore, they suffer from the disadvantages of having the low stainability and of forming only the lenses of the limited color For solving the disadvantages of the BPA-polycarbonate resins, the copolymer of BPA and an aliphatic-compound such as tricyclo[$5.2.1.0^{2,6}$]decanedimethanol (referred to as "TCDDM" hereinunder) has been proposed (see Patent Documents 1-3). However, since the polycarbonate containing the aliphatic structure is slightly inferior in terms of the heat-resistance, compared with any aromatic polycarbonate, the tendency thereof is large, and therefore, it is especially difficult to obtain an aromatic-aliphatic copolymerization polycarbonate having a large molecular weight and an excellent hue.

PRIOR ART DOCUMENTS

Patent Documents

[Patent Document 1] Japanese Patent No. 2569593
[Patent Document 2] JP-A-2003-327682
[Patent Document 3] JP-A-2003-335853

DISCLOSURE OF THE INVENTION

Problems to be Resolved by the Invention

An object of the invention is to provide a polycarbonate resin composition having a high refractive index, high Abbe's number, high strength, excellent hue and excellent stainability.

Means of Solving the Problems

The present inventors conducted studies in order to solve the above-described problems, as a result, found that it was possible to obtain a transparent polycarbonate resin composition having high refractive index, high Abbe's number, high strength, excellent hue and excellent stainability by blending a polycarbonate resin derived from a predetermined dihydroxy compound and a polycarbonate resin derived from 2,2-bis(4-hydroxyphenyl)propane, and then made the present invention.

The present invention relates to a polycarbonate resin composition prepared by blending a polycarbonate resin (A) prepared by forming carbonate bonds in tricyclo[$5.2.1.0^{2,6}$]decanedimethanol, represented by formula (1), with a diester or phosgene, and a weight-averaged molecular weight (Mw) of the polycarbonate resin (A) being equal to or more than 25,000, and a polycarbonate resin (B) prepared by reacting 2,2-bis(4-hydroxyphenyl)propane, represented by formula (2), and phosgene, and weight-averaged molecular weight (Mw) of the polycarbonate resin (B) being equal to or more than 30,000, wherein a ratio thereof, $100 \times (A)/((A)+(B))$, is from 1 to 99% by weight.

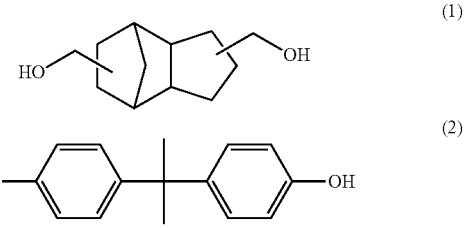

Effect of the Invention

The polycarbonate resin composition of the present invention has the well-balanced refractive index and the Abbe's number, has a high strength and excellent hue and stainability, and may be used as a variety of optical materials such as eyeglass lenses, in-car lenses, covers, windowpanes and touch panels.

MODE FOR CARRYING OUT THE INVENTION

The polycarbonate (A), which is an ingredient of the blended composition of the invention, may be obtained by carrying out the polymerization of TCDDM in a presence of a diester carbonate and catalyst according to any known melt-polycondensation method. It may be prepared also according to a method in which the reaction with phosgene is carried out. The polycarbonate resin (B) may be obtained by polymerization of BPA according to a known phosgene method (interfacial polymerization method).

The blend ratio by weight of the polycarbonate resins (A) and (B), $100 \times (A)/((A)+(B))$, is from 1 to 99% by weight. Preferably, the ratio is from 3 to 70% by weight, or more preferably, from 5 to 60% by weight. The composition having the blend ratio of smaller than 1% by weight has the low Abbe's number and no stainability, which is not preferable. The composition having the blend ratio of more than 99% by weight has the low heat resistance, low impact strength and furthermore the low refractive ratio, which is not preferable.

The polystyrene-converted weight average molecular weight (Mw) of the polycarbonate resin (A) is equal to or more than 25,000, preferably from 25,000 to 300,000, more preferably from 35,000 to 150,000, or even more preferably from 35,000 to 100,000. The blended resin composition containing the polycarbonate resin (A) whose Mw is smaller than 25,000 may be brittle, which is not preferable. The polycarbonate resin composition containing the polycarbonate resin (A) whose Mw is more than 300,000 has a high melt viscosity, which may require undesirable severer conditions for being blended. Furthermore, such a resin composition may be subjected to an injection molding under severer conditions, which may cause undesirable silver patterns in the molded products.

The polystyrene-converted weight average molecular weight (Mw) of the polycarbonate resin (B) is equal to or more than 30,000, preferably from 30,000 to 250,000, more preferably from 30,000 to 110,000, or even more preferably from 30,000 to 100,000. The blended resin composition containing the polycarbonate resin (B) whose Mw is smaller than 30,000 may be brittle, which is not preferable. The polycarbonate resin composition containing the polycarbonate resin (B) whose Mw is more than 250,000 has a high melt viscosity, which may require severer conditions for being blended. Furthermore, such a resin composition may be subjected to an injection molding under severer conditions, which may cause undesirable silver patterns in the molded products.

The difference (ΔMw) of polystyrene-converted weight average molecular weight (Mw) between the polycarbonate resins (A) and (B) is preferably from 0 to 120,000, more preferably from 0 to 80,000, or even more preferably from 0 to 50,000. The polycarbonate resins (A) and (B), whose ΔMw is more than 120,000, may show a remarkably large difference in viscosity therebetween, and may be compatible hardly. Therefore, the resin composition, containing such the polycarbonate resins, may show lowered transparency, which is not preferable.

The glass-transition temperature (Tg) of the blended resin composition of the invention is preferably from 95 to 180 degrees Celsius, or more preferably from 105 to 170 degrees Celsius. The composition, having Tg of lower than 95 degrees Celsius, may be used in only a narrow temperature range, which is not preferable. The composition, having Tg of higher than 180 degrees Celsius, may have to be subjected to a molded process under severer conditions, which is not preferable.

Next, examples of the method for preparing the polycarbonate resins according to the present invention will be described in detail.

The method for preparing the polycarbonate resin (A) is not limited, and the polycarbonate resin (A) may be prepared according to any method in which carbonate bonds are formed in the diol compound represented by the above-described formula (1) with a diester or phosgene. Among the methods, as the method for preparing the polycarbonate resin (A), the known melt-polycondensation method, in which the reaction of the diol compound represented by the above-described formula (1) and a diester-carbonate is carried out in presence of a basic-compound catalyst, transesterification catalyst or mixed catalyst thereof, is preferably used.

As the diester carbonate, diphenyl carbonate, ditolyl carbonate, bis(chlorophenyl)carbonate, m-crezyl carbonate, dimethyl carbonate, diethyl carbonate, dibutyl carbonate, dicyclohexyl carbonate and the like are exemplified. Among these, diphenyl carbonate is especially preferable. Diphenyl carbonate is preferably used by a ratio of from 0.90 to 1.15 moles, or more preferably by a ratio of from 0.95 to 1.05 moles, with respect to 1 mole of the total of the dihydroxy compounds.

As the basic-compound catalyst, alkali metal and/or alkali earth metal compounds, nitrogen-containing compounds and the like are especially exemplified. Specific examples thereof include organic acid salts, inorganic acid salts, oxides, hydroxides, hydrides, and alkoxides of alkali metal and alkali earth metal compounds; and quaternary ammonium hydroxides and the salts thereof, and amines. They may be used alone respectively or in combination thereof.

As the alkali metal compound, sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium boron hydride, sodium boron phenylated, sodium benzoate, potassium benzoate, cesium benzoate, lithium benzoate, disodium hydrogen phosphate, dipotassium hydrogen phosphate, dilithium hydrogen phosphate, disodium phenylphosphate, disodium-, dipotassium-, dicesium- and dilithium-salts of bisphenol A, sodium-, potassium-, cesium- and lithium-salts of phenol, or the like are used.

As the alkali earth metal compound, specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate or the like are used.

As the nitrogen-containing compound, specifically, quaternary ammonium hydroxides having an alkyl or aryl group such as tetramethyl ammonium hydroxide, tetraethyl ammonium hydroxide, tetrapropyl ammonium hydroxide, tetrabutyl ammonium hydroxide and trimethylbenzyl ammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; bases and basic salts such as ammonia, tetramethyl ammonium borohydride, tetrabutyl ammonium borohydride, tetrabutyl ammonium tetraphenylborate, tetraphenyl ammonium tetraphenylborate, or the like are used.

As the transesterification catalyst, salts of zinc, tin, zirconium or lead are preferably used, and may be used alone respectively or in combination thereof. Specifically, zinc acetate, zinc benzoate, zinc 2-ethylhexanoate, thin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate, lead (IV) acetate or the like is used. These catalysts may be respectively used preferably by a ratio of from $10^{-9}$ to $10^{-3}$ mole, or more preferably by a ratio of from $10^{-7}$ to $10^{-4}$ mole, with respect to 1 mole of the total dihydroxy compounds.

According to the invention, in a melt-polycondensation method, the above-described raw materials and catalyst are used, and the melt-polycondensation is carried out by interesterification reaction thereof under heat and under an ordinary or reduced pressure while the by-products are removed. The reaction is usually carried out in two or more multiple-stage step.

Specifically, the reaction in the first stage is carried out at a temperature of from 120 to 220 degrees Celsius, or preferably at a temperature of from 160 to 200 degrees Celsius, under a pressure of from an ordinary pressure to 200 Torr for from 0.1 to 5 hours, or preferably for from 0.5 to 3 hours. Next, the reaction is continuously carried out while the temperature is gradually raised to a final temperature of from 230 to 260 degrees Celsius and the pressure is gradually reduced to a final pressure of equal to or less than 1 Torr. Finally, the polycondensation is carried out at a temperature of from 230 to 260 degrees Celsius under a reduced pressure of not more than 1 Torr, and then, is terminated by recovering pressure with nitrogen gas when the viscosity reaches the desired value. The reaction time under a pressure of not more than 1 Torr is from 0.1 to 2 hours, the total reaction time is from 1 to 6 hours, or usually from 2 to 5 hours.

Such a reaction may be carried out in a continuous or batch manner. The reaction device to be used may be any vertical type equipped with an anchor agitating blade, maxblend agitating blade, helical ribbon agitating blade or the like, any horizontal type equipped with a paddle agitating blade, grid agitating blade, glass agitating blade or the like, or any extruder type equipped with a screw. And they may be used in combination considering the viscosity of the polymerized After the completion of the polymerization reaction, the catalyst is removed or deactivated in order to maintain heat stability and hydrolysis stability of the polycarbonate resin thus obtained. Usually, a method for deactivating a catalyst by addition of known acid substance is suitably applied. Preferable examples of the acid substance include aromatic sulfonic acids such as p-toluene sulfonic acid, aromatic sulfonic acid esters such as butyl p-toluene-sulfonate and hexyl p-toluene-sulfonate, aromatic sulfonic acid salts such as dodecylbenzene sulfonic acid tetrabutyl phosphonium salt, organic halides such as stearoyl chloride, benzoyl chloride and p-toluene-sulfonyl chloride, alkyl sulfates such as dimethyl sulfate and organic halides such as benzyl chloride.

After the deactivation of the catalyst, a step to remove low boiling point compounds in the polymer with vaporization under a pressure of 0.1 to 1 Torr at a temperature of from 200 to 350 degrees Celsius may be added. For its purpose, a horizontal apparatus equipped with a stirring blade with excellent surface renewing capacity such as paddle blade, lattice blade, spectacle shaped blade, etc. or thin film vaporizer is suitably used.

Furthermore according to the invention, an antioxidant, pigment, dyestuff, reinforcing agent, filler, ultraviolet absorber, lubricating agent, releasing agent, crystalline nucleus agent, plasticizer, flowability improving agent, antistatic agent, antibacterial agent or the like is preferably added along with the heat resistance agent or the hydrolytic stability agent.

The polycarbonate resin (B) can be obtained by polymerization of the hydroxy compound represented by the above-described formula (2) according to the known phosgene method (interfacial polymerization method). For example, the polycarbonate resin (B) can be prepared according to the interfacial polymerization method in which the dihydroxy compound represented by the above-described formula (2) is reacted with phosgene in a presence of solvent, an end-stopping agent and an acid-binding agent. In the method, generally, the dihydroxy compound and the end-stopping agent are dissolved in an aqueous solution of the acid-binding agent, and the reaction is carried out in a presence of organic solvent.

As the acid-binding agent, for example, pyridine, or hydroxides of alkali metal such as sodium hydroxide and potassium hydroxide are preferably used. And as the solvent, for example, methylene chloride, chloroform, chlorobenzene, xylene or the like is preferably used. Furthermore, for promoting the polymerization, as a catalyst, tertiary amines such as triethyl amine, or quaternary ammonium salts such as tetra-n-butyl ammonium bromide are used.

As the end-stopping agent which is used for adjusting the polymerization degree, mono-functional hydroxy compounds such as phenol, p-tert-butylphenol, p-cumylphenol and phenols having a long alkyl group are used. Furthermore, if desired, a small amount of an antioxidant such as sodium sulfite and sodium hydrosulfite may be added.

The reaction is usually carried out at a temperature of from 0 to 150 degrees Celsius, or preferably at a temperature of from 5 to 40 degrees Celsius. The reaction time depends on the reaction temperature, and, the reaction time is usually from 0.5 min. to 10 hours, or preferably from 1 min. to 2 hours. And it is preferable that the pH value of the reaction system is kept equal to or more than 10 during the reaction.

The blended resin composition of the present invention may be prepared according to the method in which solids of polycarbonate resins (A) and (B) are prepared respectively, blended and then kneaded by a kneading machine, the method in which a solid of the polycarbonate resin (B) is added to the polycarbonate resin (A) in a molten state, or a solid of the polycarbonate resin (A) is added to the polycarbonate resin (B) in a molten state and then kneaded by a kneading machine. Or the blended resin composition of the present invention may be prepared according to the method in which polycarbonate resins (A) and (B) are blended in a molten state and then kneaded by a kneading machine. Kneading may be performed in a continuous process or in a batch wise. As the kneading machine, any of an extruder, labopastomill and kneader may be used. When kneading is performed in a batch wise, a labopastomill or a kneader is suitably applied. When any polycarbonate resin produced by a melt-polycondensation process is used, it is preferable to perform kneading after deactivation of a catalyst in terms of avoiding transesterfication during kneading.

As another process for producing the polycarbonate resin composition of the present invention, also a process comprising dissolving the polycarbonate resins (A) and (B) in a solvent and pouring it into a mold and then vaporizing the solvent may be applied. As the solvent, methylene chloride, chloroform and cresol are used. According to the process, it is possible to dissolve and add any additive at the same time, which is convenient.

If necessary, antioxidant, a releasing agent, an ultraviolet absorber, a flowability improving agent, a reinforcing agent, crystalline nucleus agent, dyestuff, an antistatic agent, and an antibacterial agent may be added to the blended resin composition of the present invention. These additives may be added to each the resins (A) and (B) or either one thereof prior to blending and kneading or may be added and kneaded at the same time during blending and kneading or may be kneaded after blending.

EXAMPLES

The present invention will be illustrated in further detail with reference to several examples below, which are not intended to limit the scope of the present invention. The data of the examples were measured according to the following methods or by using the following apparatus.

1) MFR: MFR measurements were carried out at 260 degrees Celsius under load of 360 g according to JISK7210.
2) Refractive Index and Abbe's number: Each of the polycarbonate resins was pressed into a cuboid-shape of 3 mm (thickness)×8 mm×8 mm, and then the values were measured by using a refractometer manufactured by ATAGO.
3) Glass transition temperature (Tg): Using a differential scanning calorimeter (SSC-5200 manufactured by Seiko Instruments), DSC measurements were carried out at the rate of 10 degrees Celsius/min.
4) Stainability: A dyeing brown fluid was prepared by adding 5 g of "BPI Brown" as a dispersive dyestuff to 1 L of pure water and then kept hot at a temperature of from 90 to 91.5 degrees Celsius. Stainability tests were carried out by soaking a test-sample piece of 50 mmφ×3.0 mm in the fluid at 90 degrees Celsius for an hour. The spectral transmittance was measured by a spectrophotometer (Product name: "U-2910") manufactured by HITACHI. The depth of color was calculated by using the formula of "(the transmittance before the dyeing−the transmittance after the dyeing)/the transmittance before the dyeing×100".
5) Strength: Impact resistance value for a falling ball: A steel ball was dropped on a test-piece of 50 mmφ×3.0 mm from the 107 cm-height, and then the weight of the steel ball was specified when the piece was broken.
6) Hue: The obtained pellets were subjected to an injection molding into a disk-shaped test piece of 50 mmφ and 3 mm thickness, and then the YI (yellow index) thereof was measured by a colorimeter (Tokyo Denshoku CO., LTD. TC-1800MK2).
7) Mw: The resin sample was dissolved in chloroform and the polystyrene-converted weight average molecular weight thereof was measured by GPC (Shodex GPC system11).

Synthetic Example 1

Polycarbonate Resin (A)

In a 50 L-reactor vessel equipped with an agitating instrument and a distillation apparatus, 9.77 kg (49.76 moles) of tricyclodecane dimethanol, 10.74 Kg (50.14 moles) of diphenyl carbonate and 0.0152 g ($1.81 \times 10^{-4}$ moles) of sodium hydrogen carbonate were placed, and heated to 215 degrees Celsius at 760 Torr under a nitrogen gas-atmosphere for an hour under stirring. After that, the pressure was reduced to 150 Torr for 15 minutes, and then, the interesterification reaction was carried out at 215 degrees Celsius at 150 Torr for 20 minutes. Furthermore, the temperature was raised to 240 degrees Celsius at 37.5 degrees Celsius/hr, and then maintained at 240 degrees Celsius for at 150 Torr 10 minutes. After that, the pressure was reduced to 120 Torr for 10 minutes, and then maintained at 240 degrees Celsius at 120 Torr for 70 minutes. After that, the pressure was reduced to 100 Torr for 10 minutes, and then maintained at 240 degrees Celsius at 100 Torr for 10 minutes. The pressure was reduced to 1 Torr or less for 40 minutes, and then the polymerization was carried out at 240 degrees Celsius at a pressure of equal to or less than 1 Torr for 10 minutes under stirring. After termination of the reaction, nitrogen gas was blown into the vessel for pressurizing, and then the produced polycarbonate resin was taken out while being subjected to pelletization. Polycarbonate resin (A) having MFR of 10.0 g/10 min, Tg of 82 degrees Celsius and Mw of 69,000 was obtained.

Example 1

5 kg of the pellets of the polycarbonate resin (A) and 5 kg of pellets of a polycarbonate resin formed of bisphenol A, "Iupilon S-3000" (manufactured by Mitsubishi Engineering-Plastics Corporation; Mw: 47,800), were sufficiently mixed while being shaken, kneaded at 260 degrees Celsius by an extruder and subjected to a pelletization; and 7.8 kg of blended pellets were obtained. The pellets had Tg of 119 degrees Celsius, and any inflection point was not found. The physical properties of the obtained resin were summarized in Table 1.

The obtained pellets were pressured into circular-disk shapes of a 50 mm-diameter and a 3 mm-thickness. The circular disk was transparent. The YI value of the circular disk was 1.68, which indicated that the coloration was remarkably low. The result of the falling-ball test was equal to or more than 535 g, which indicated the high impact strength. The result of the stainability test was 91%, which indicated high stainability.

Example 2

3 kg of the pellets of the polycarbonate resin (A) and 7 kg of pellets of a polycarbonate resin formed of bisphenol A, "Iupilon S-3000" (manufactured by Mitsubishi Engineering-Plastics Corporation), were sufficiently mixed while being shaken, kneaded at 260 degrees Celsius by an extruder, and subjected to a pelletization; and 7.8 kg of blended pellets were obtained. The pellets had Tg of 125 degrees Celsius, and any inflection point was not found.

The obtained pellets were pressured into circular-disk shapes of a 50 mm-diameter and a 3 mm-thickness. The circular disk was transparent. The YI value of the circular disk was 1.77, which indicated that the coloration was significantly low. The result of the falling-ball test was equal to or more than 535 g, which indicated the high impact strength. The result of the stainability test was 88%, which indicated high stainability.

Example 3

1.5 kg of the pellets of the polycarbonate resin (A) and 8.5 kg of pellets of a polycarbonate resin formed of bisphenol A, "Iupilon S-3000" (manufactured by Mitsubishi Engineering-Plastics Corporation), were sufficiently mixed while being shaken, kneaded at 260 degrees Celsius by an extruder, and subjected to a pelletization; and 7.8 kg of blended pellets were obtained. The pellets had Tg of 132 degrees Celsius, and any inflection point was not found.

The obtained pellets were pressured into circular-disk shapes of a 50 mm-diameter and a 3 mm-thickness. The circular disk was transparent. The physical properties of the obtained resin were summarized in Table 1. The YI value of the circular disk was 1.69, which indicated that the coloration was remarkably low. The result of the falling-ball test was equal to or more than 535 g, which indicated the high impact strength. The result of the stainability test was 80%, which indicated high stainability.

Comparative Example 1

The pellets of a polycarbonate resin, "Iupilon S-3000" (manufactured by Mitsubishi Engineering-Plastics Corporation), were pressured into circular-disk shapes of a 50 mm-diameter and a 3 mm-thickness. The measurements of the physical properties and the tests were carried out, and the results are summarized in Table 1. The Abbe's number thereof was low, 30; and the stainability thereof was very low, 8%.

Comparative Example 2

The pellets of the polycarbonate (A) were pressured into circular-disk shapes of a 50 mm-diameter and a 3 mm-thickness. The measurements of the physical properties and the tests were carried out, and the results are summarized in Table 1. The refractive index thereof was low, 1.527; and the Tg thereof was very low, 80 degrees Celsius. The impact strength thereof was low, 16 g.

Synthetic Example 2

Polycarbonate (A')

In a 50 L-reactor vessel equipped with an agitating instrument and a distillation apparatus, 9.91 kg (61.5 moles) of tricyclodecane dimethanol, 14.61 Kg (67.8 moles) of diphenyl carbonate and 0.0152 g ($1.81 \times 10^{-4}$ moles) of sodium hydrogen carbonate were placed, and heated to 215 degrees Celsius at 760 Torr under a nitrogen gas-atmosphere for an hour under stirring. After that, the pressure was reduced to 150 Torr for 15 minutes, and then, the interesterification reaction was carried out at 215 degrees Celsius at 150 Torr for 20 minutes. Furthermore, the temperature was raised to 240 degrees Celsius at 37.5 degrees Celsius/hr, and then maintained at 240 degrees Celsius for at 150 Torr 10 minutes. After that, the pressure was reduced to 120 Torr for 10 minutes, and then maintained at 240 degrees Celsius at 120 Torr for 70 minutes. After that, the pressure was reduced to 100 Torr for 10 minutes, and then maintained at 240 degrees Celsius at 100 Torr for 10 minutes. The pressure was reduced to 1 Torr or less for 40 minutes, and then the polymerization was carried out at 240 degrees Celsius at a pressure of equal to or less than 1 Torr for 10 minutes under stirring. After termination of the reaction, nitrogen gas was blown into the vessel for pressurizing, and then the produced polycarbonate resin was taken out while being subjected to pelletization. Polycarbonate resin (A') having MFR of 105.0 g/10 min, Tg of 78 degrees Celsius and Mw of 24,000 was obtained.

Comparative Example 3

5 kg of the pellets of the polycarbonate resin (A') and 5 kg of pellets of a polycarbonate resin formed of bisphenol A, "Iupilon S-3000" (manufactured by Mitsubishi Engineering-Plastics Corporation; MW47,8000), were sufficiently mixed while being shaken, kneaded at 260 degrees Celsius by an extruder, and subjected to a pelletization; and 7.8 kg of blended pellets were obtained. The pellets had Tg of 117 degrees Celsius, and any inflection point was not found.

Although the pressure molding of the pellets was tried, no circular-disk of a 50 mm-diameter and a 3 mm-thickness was obtained since the pellets were brittle.

Comparative Example 4

5 kg of the pellets of the polycarbonate resin (A) and 5 kg of pellets of a polycarbonate resin formed of bisphenol A, "Iupilon HL-7000" (manufactured by Mitsubishi Engineering-Plastics Corporation; Mw: 29,500), were sufficiently mixed while being shaken, kneaded at 260 degrees Celsius by an extruder, and subjected to a pelletization; and 7.8 kg of blended pellets were obtained. The pellets had Tg of 117 degrees Celsius, and any inflection point was not found.

Although the pressure molding of the pellets was tried, no circular-disk of a 50 mm-diameter and a 3 mm-thickness was obtained since the pellets were brittle.

Comparative Example 5

In a 50 L-reactor vessel equipped with an agitating instrument and a distillation apparatus, 10.58 Kg (46.33 moles) of bisphenol A, 9.09 kg (46.33 moles) of tricyclodecane dimethanol, 20.37 Kg (95.07 moles) of diphenyl carbonate and 0.0152 g ($1.81 \times 10^{-4}$ moles) of sodium hydrogen carbonate were placed, and heated to 215 degrees Celsius at 760 Torr under a nitrogen gas-atmosphere for an hour under stirring. After that, the pressure was reduced to 150 Torr for 15 minutes, and then, the interesterification reaction was carried out at 215 degrees Celsius at 150 Torr for 20 minutes. Furthermore, the temperature was raised to 240 degrees Celsius at 37.5 degrees Celsius/hr, and then maintained at 240 degrees Celsius for at 150 Torr 10 minutes. After that, the pressure was reduced to 120 Torr for 10 minutes, and then maintained at 240 degrees Celsius at 120 Torr for 70 minutes. After that, the pressure was reduced to 100 Torr for 10 minutes, and then maintained at 240 degrees Celsius at 100 Torr for 10 minutes. The pressure was reduced to 1 Torr or less for 40 minutes, and then the polymerization was carried out at 240 degrees Celsius at a pressure of equal to or less than 1 Torr for 10 minutes under stirring. After termination of the reaction, nitrogen gas was blown into the vessel for pressurizing, and then the produced polycarbonate resin was taken out while being subjected to pelletization. Polycarbonate resin (X) having MFR of 10.0 g/10 min and Tg of 108 degrees Celsius was obtained.

The obtained pellets of the polycarbonate resin (X) were pressured into circular-disk shapes of a 50 mm-diameter and a 3 mm-thickness. The measurements of the physical properties and the tests were carried out, and the results were summarized in Table 1. The impact strength was low, 16 g; the YI value was 3.15, which indicated that coloration thereof was remarkable.

Comparative Example 6

7 kg of the pellets of the polycarbonate resin (X) and 3 kg of pellets of a polycarbonate resin formed of bisphenol A, "Iupilon S-3000" (manufactured by Mitsubishi Engineering-Plastics Corporation), were sufficiently mixed while being shaken, kneaded at 260 degrees Celsius by an extruder, and subjected to pelletization; and 7.8 kg of blended pellets were obtained. The pellets had Tg of 118 degrees Celsius, and any inflection point was not found.

The obtained pellets were pressured into circular-disk shapes of a 50 mm-diameter and a 3 mm-thickness. The circular disk was transparent. The measurements of the physical properties and the tests were carried out, and the results were summarized in Table 1. The impact strength was slightly low, 150 g; and the YI value was 2.83, which indicated that coloration was recognized.

TABLE 1

|  | Refractive Index | Abbe's Number | Tg | Stainability | Strength | YI |
|---|---|---|---|---|---|---|
| Example 1 | 1.573 | 39 | 119 | 91 | >535 | 1.68 |
| Example 2 | 1.567 | 35 | 125 | 88 | >535 | 1.77 |
| Example 3 | 1.578 | 32 | 132 | 80 | >535 | 1.69 |
| Comparative Example 1 | 1.583 | 30 | 145 | 8 | >535 | 1.34 |
| Comparative Example 2 | 1.527 | 57 | 80 | 95 | 16 | 1.55 |
| Comparative Example 3 | — | — | 117 | — | — | — |
| Comparative Example 4 | — | — | 117 | — | — | — |
| Comparative Example 5 | 1.564 | 36 | 108 | 66 | 10 | 3.15 |
| Comparative Example 6 | 1.561 | 36 | 118 | 68 | 150 | 2.83 |

The invention claimed is:

1. A polycarbonate resin composition, comprising:
   a polycarbonate resin component consisting of a polycarbonate resin (A) obtained by reacting tricyclo[$5.2.1.0^{2,6}$]decanedimethanol with a diester, phosgene, or both, and a polycarbonate resin (B) obtained by reacting 2,2-bis(4-hydroxyphenyl)propane and phosgene, wherein the polycarbonate resin (A) is a homopolymer of tricyclo[$5.2.1.0^{2,6}$]decanedimethanol and has a weight-average molecular weight of at least 25,000, the polycarbonate resin (B) is a homopolymer of 2,2-bis(4-hydroxyphenyl)propane and has a weight-average molecular weight of at least 30,000, and the polycarbonate resin (A) and the polycarbonate resin (B) are blended in the composition such that a ratio $100\times(A)/((A)+(B))$ is from 30 to 60% by weight.

2. The polycarbonate resin composition of claim 1, wherein the ratio $100\times(A)/((A)+(B))$ is from 30 to 50% by weight.

3. An optical lens, comprising:
the polycarbonate resin composition of claim 1.

4. The polycarbonate resin composition of claim 1, wherein the polycarbonate resin (B) is obtained by reacting only 2,2-bis(4-hydroxyphenyl)propane and phosgene.

5. A process of producing the polycarbonate resin composition of claim 1, the process comprising:
reacting tricyclo[$5.2.1.0^{2,6}$]decanedimethanol with a diester, phosgene, or both such that a polycarbonate resin (A) which is a homopolymer of tricyclo[$5.2.1.0^{2,6}$]decanedimethanol and has a weight-average molecular weight of at least 25,000 is obtained;

reacting 2,2-bis(4-hydroxyphenyl)propane and phosgene such that a polycarbonate resin (B) which is a homopolymer of 2,2-bis(4-hydroxyphenyl)propane and has a weight-average molecular weight of at least 30,000 is obtained; and blending the polycarbonate resin (A) and the polycarbonate resin (B) in a ratio $100\times(A)/((A)+(B))$ from 30 to 60% by weight.

6. The polycarbonate resin composition of claim 1, wherein the weight-average molecular weight of the polycarbonate resin (A) is from 35,000 to 150,000.

7. The polycarbonate resin composition of claim 6, wherein the weight-average molecular weight of the polycarbonate resin (A) is from 35,000 to 100,000.

8. The polycarbonate resin composition of claim 1, wherein the weight-average molecular weight of the polycarbonate resin (B) is from 30,000 to 250,000.

9. The polycarbonate resin composition of claim 8, wherein the weight-average molecular weight of the polycarbonate resin (B) is from 30,000 to 100,000.

10. The polycarbonate resin composition of claim 1, wherein a difference between a polystyrene-converted weight average molecular weight of the polycarbonate resin (A) and a polystyrene-converted weight average molecular weight (B) is from 0 to 120,000.

11. The polycarbonate resin composition of claim 10, wherein a difference between a polystyrene-converted weight average molecular weight of the polycarbonate resin (A) and a polystyrene-converted weight average molecular weight (B) is from 0 to 80,000.

12. The polycarbonate resin composition of claim 1, wherein a glass-transition temperature of the polycarbonate resin composition is from 95 to 180 degrees Celsius.

13. The process of claim 5, wherein the reacting of tricyclo [$5.2.1.0^{2,6}$]decanedimethanol with a diester, phosgene, or both, to obtain a polycarbonate resin (A), comprises a melt-polycondensation method, and wherein the melt-polycondensation method comprises reacting the tricyclo[$5.2.1.0^{2,6}$] decanedimethanol with a diester-carbonate in presence of a catalyst comprising a basic-compound catalyst, a transesterification catalyst, or a mixed catalyst thereof.

14. The process of claim 13, wherein the diester carbonate comprises diphenyl carbonate.

15. The process of claim 13, wherein the catalyst comprises a basic-compound catalyst comprising an alkali metal compound, an alkali earth metal compound, a nitrogen-containing compound, or a combination thereof.

16. The process of claim 13, wherein the catalyst comprises a transesterification catalyst comprising a zinc salt, a tin salt, a zirconium salt, a lead salt, or a combination thereof.

17. The process of claim 5, wherein the reacting of 2,2-bis(4-hydroxyphenyl)propane and phosgene is in a presence of organic solvent, an end-stopping agent, and an acid-binding agent.

18. The process of claim 17, wherein the acid-binding agent comprises pyridine, a hydroxide of alkali metal, or a mixture thereof.

19. The process of claim 17, wherein the end-stopping agent comprises a mono-functional hydroxy compound.

20. The process of claim 5, wherein the blending comprises:
dissolving the polycarbonate resin (A) and the polycarbonate resin (B) in a solvent, to obtain a solution,
pouring the solution into a mold, and
vaporizing the solvent.

* * * * *